US011803339B2

(12) United States Patent
Morishita

(10) Patent No.: US 11,803,339 B2
(45) Date of Patent: Oct. 31, 2023

(54) IMAGE FORMING SYSTEM FOR EXECUTING FAILURE PREDICTION OF MULTIFUNCTION PERIPHERAL AND SPECIFYING ABNORMAL IMAGE FORMING APPARATUS AMONG IMAGE FORMING APPARATUSES THAT SENDS NUMERIC VALUE THAT DEVIATES MOST FROM MEDIAN

(71) Applicant: KYOCERA Document Solutions Inc., Osaka (JP)

(72) Inventor: Yosuke Morishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 34 days.

(21) Appl. No.: 17/656,516

(22) Filed: Mar. 25, 2022

(65) Prior Publication Data

US 2022/0317949 A1 Oct. 6, 2022

(30) Foreign Application Priority Data

Mar. 31, 2021 (JP) ................................ 2021-060273

(51) Int. Cl.
*G06F 3/12* (2006.01)
*G03G 15/20* (2006.01)

(52) U.S. Cl.
CPC ....... *G06F 3/1234* (2013.01); *G03G 15/2039* (2013.01); *G06F 3/1207* (2013.01); *G06F 3/1224* (2013.01); *G06F 3/1288* (2013.01)

(58) Field of Classification Search
CPC .... G06F 3/1234; G06F 3/1207; G06F 3/1224; G06F 3/1288; G03G 15/2039
USPC ........................................................ 358/1.1
See application file for complete search history.

(56) References Cited

U.S. PATENT DOCUMENTS 5,619,307 A 4/1997 Machino et al.
2005/0154562 A1* 7/2005 Matsuura .............. G06F 11/008 702/185
2005/0262394 A1* 11/2005 Yasukawa ........... G06F 11/0748 714/E11.026
2012/0075659 A1* 3/2012 Sawada .................. G03G 15/55 358/1.14

FOREIGN PATENT DOCUMENTS

JP H08-023408 A 1/1996

* cited by examiner

*Primary Examiner* — Allen H Nguyen
(74) *Attorney, Agent, or Firm* — Studebaker & Brackett PC

(57) ABSTRACT

An image forming system includes a plurality of image forming apparatuses and a server. The server is connected to the image forming apparatuses in a communicable manner. The server receives data indicating a numerical value of a common item from each of the image forming apparatuses, calculates a median of the data, and specifies an abnormal image forming apparatus from among the image forming apparatuses that has sent a numeric value of the common item that deviates the most from the median.

5 Claims, 3 Drawing Sheets

Start
Receive data from each MFP — S101
Calculate median of data — S103
Specify MFP that has sent value deviating most from median — S105
Issue request for solution to specified MFP — S107
End

IMAGE FORMING SYSTEM FOR EXECUTING FAILURE PREDICTION OF MULTIFUNCTION PERIPHERAL AND SPECIFYING ABNORMAL IMAGE FORMING APPARATUS AMONG IMAGE FORMING APPARATUSES THAT SENDS NUMERIC VALUE THAT DEVIATES MOST FROM MEDIAN

INCORPORATION BY REFERENCE

The present application claims priority under 35 U.S.C. § 119 to Japanese Patent Application No. 2021-060273, filed on Mar. 31, 2021. The contents of this application are incorporated herein by reference in their entirety.

BACKGROUND

The present disclosure relates to an image forming system.

An image forming system executes failure prediction of an image forming apparatus based on history information such as the number of sheets printed or a power-on time.

SUMMARY

An image forming system according to an aspect of the present disclosure includes a plurality of image forming apparatuses and a server. The server is connected to the image forming apparatuses in a communicable manner. The server receives data indicating a numerical value of a common item from each of the image forming apparatuses, calculates a median of the data, and specifies an abnormal image forming apparatus from among the image forming apparatuses that has sent a numeric value of the numeric values that deviates most from the median.

DETAILED DESCRIPTION

Figure 1:
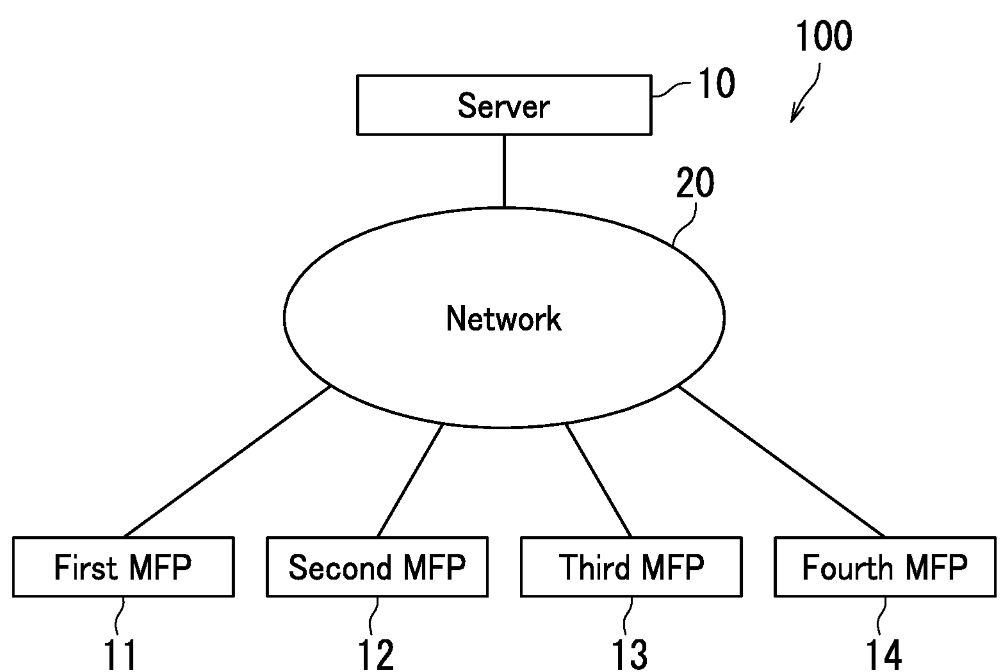
FIG. 1 is a block diagram of an example of the configuration of an image forming system according to an embodiment.

The following describes an embodiment of the present disclosure with reference to the accompanying drawings. Note that elements that are the same or equivalent are indicated by the same reference signs in the drawings and description thereof is not repeated.

First of all, an image forming system 100 according to an embodiment will be described with reference to FIG. 1. FIG. 1 is a block diagram of an example of the configuration of the image forming system 100. The image forming system 100 includes a plurality of image forming apparatuses. Each of the image forming apparatuses is a multifunction peripheral (MFP), for example. The MFP is a multifunction peripheral having functions of a copier, a printer, and a facsimile machine.

As illustrated in FIG. 1, the image forming system 100 includes a server 10, a first MFP 11, a second MFP 12, a third MFP 13, and a fourth MFP 14. The server 10 is connected to the first to fourth MFPs 11 to 14 in a communicable manner through a network 20. The first to fourth MFPs 11 to 14 correspond to "a plurality of image forming apparatuses".

Figure 2:
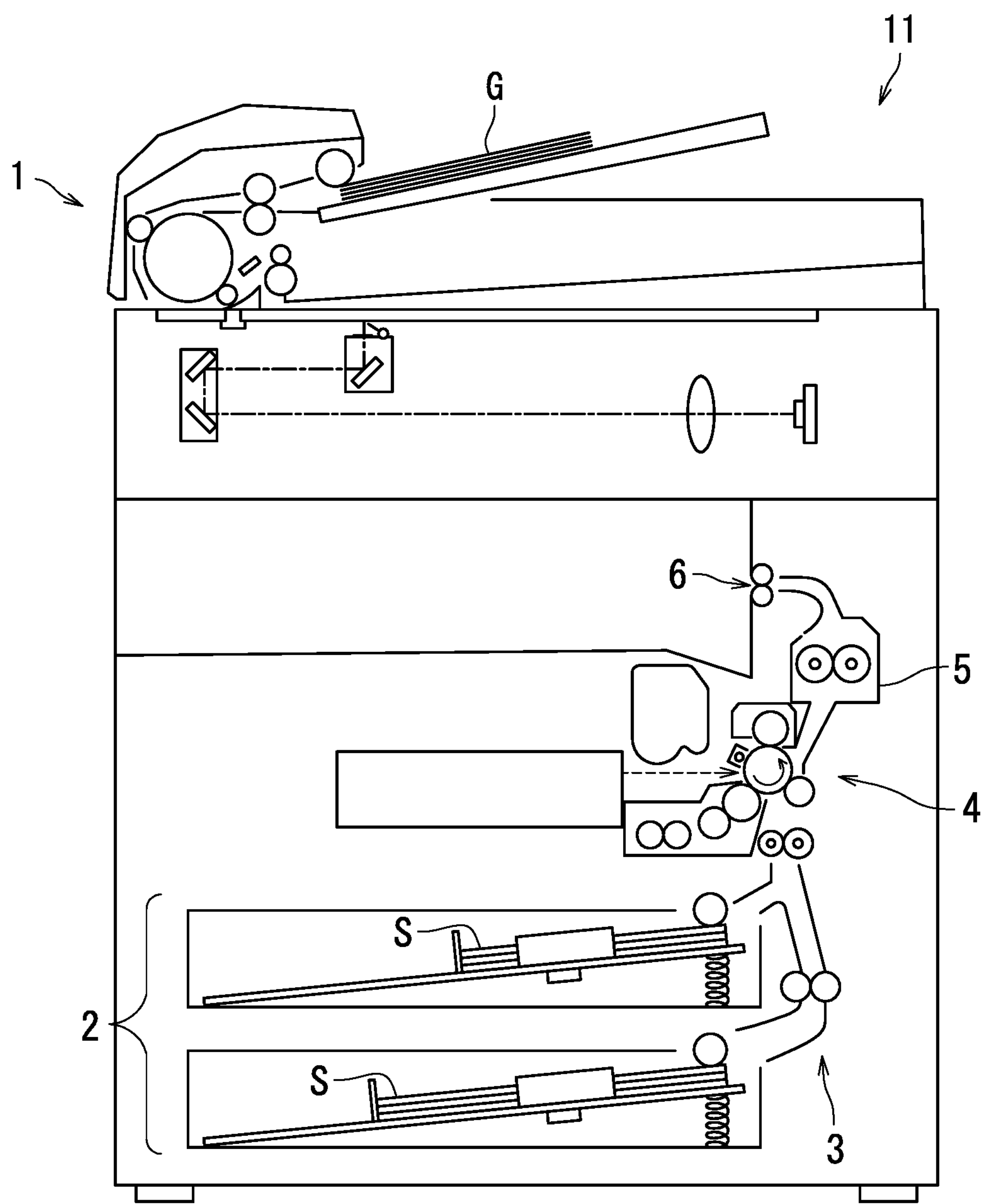
FIG. 2 is a diagram illustrating an example of the hardware configuration of an image forming apparatus.

With reference to FIGS. 1 and 2, the hardware configuration of the first MFP 11 will be described next. FIG. 2 is a diagram illustrating an example of the hardware configuration of the first MFP 11. The second to fourth MFPs 12 to 14 are the same as the first MFP 11, and therefore description of the second to fourth MFPs 12 to 14 is omitted.

As illustrated in FIG. 2, the first MFP 11 includes a reading section 1, feeding sections 2, a conveyance section 3, an image forming section 4, a fixing section 5, and an ejection section 6.

The reading section 1 reads an image of a document G The reading section 1 generates image data from the read image. Each of the feeding sections 2 accommodates a plurality of sheets S, and feeds the sheets S to the conveyance section 3 one at a time. The sheets S are made from paper or a synthetic resin. The conveyance section 3 includes a plurality of conveyance roller pairs, and conveys each sheet S to the image forming section 4.

The image forming section 4 electrographically forms a toner image on the sheet S. The image forming section 4 includes a photosensitive drum, a charger, a light exposure device, a development device, a replenishment device, a transfer device, a cleaner, and a static eliminator. The toner image indicates the image of the document G for example. The fixing section 5 applies heat and pressure to the toner image to fix the toner image to the sheet S. The conveyance section 3 conveys the sheet S with the toner image fixed thereto to the ejection section 6. The ejection section 6 ejects the sheet S out of the first MFP 11.

Figure 3:
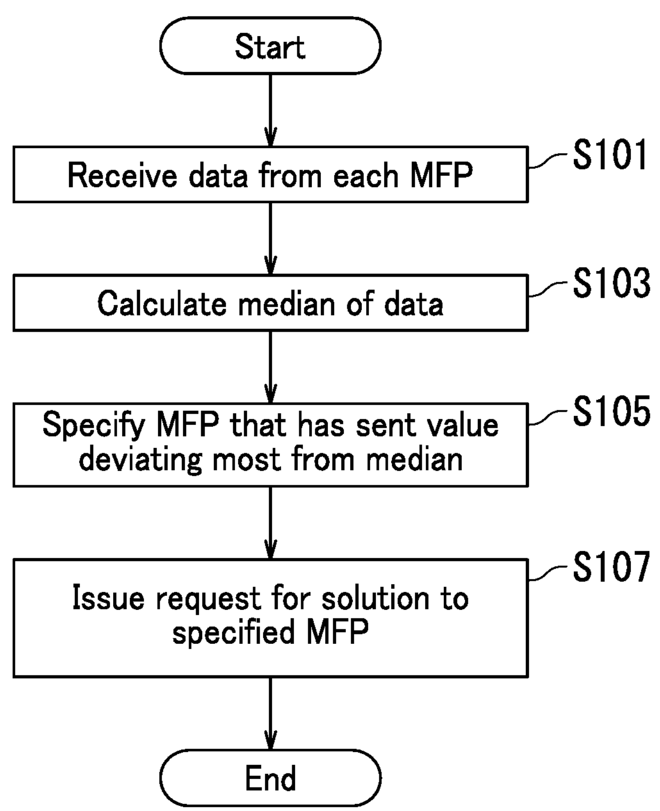
FIG. 3 is a flowchart depicting an example of an operation of a server.

With reference to FIGS. 1 to 3, an operation of the server 10 will be described next. FIG. 3 is a flowchart depicting an example of the operation of the server 10.

Step S101: The server 10 receives data indicating a numerical value of a common item from each of the first to fourth MFPs 11 to 14. The first to fourth MFPs 11 to 14 execute data transmission to the server 10 at mutually different times so as to avoid concentration of data transmission.

Step S103: The server 10 calculates a median of the data. Calculation is performed at a predetermined time once a day, for example. In a case in which the server 10 is to monitor a large number of image forming apparatuses, it is possible that the image forming apparatuses are grouped based on history information such as the number of sheets printed or a power-on time and a median of the data is calculated for each group.

Step S105: The server 10 specifies an abnormal MFP from among the first to fourth MFPs 11 to 14 that has sent a numerical value deviating the most from the median.

The server 10 receives data indicating numerical values "10", "2", "2", and "1" respectively from the first to fourth MFPs 11 to 14 together with the serial numbers of the MFPs. The median is "2". The server 10 specifies as an abnormal MFP the first MFP 11 that has sent the numeric value "10", which deviates the most from the median "2".

Step S107: The server 10 issues a request for automatic solution or a request for user manual solution to the specified abnormal MFP. The server 10 may receive in advance selection as to which of the request for automatic solution or the request for user manual solution is to issue. When processing in Step S107 ends, the operation of the server 10 ends.

The data indicating a numeric value of the common item in Step S101 is data indicating the temperature of the fixing section 5, for example. Each solution in Step S107 in this case is "restart", for example. Other examples of the solution include "execution of drum refreshment", "setting change", and "message issuance".

When the status of the abnormal MFP does not improve even after the request for automatic solution has been issued a predetermined number of times in Step 107, a notice of dispatch of service personnel may be issued.

According to the present embodiment, the image forming system 100 can detect initial failure of any of the first to fourth MFPs 11 to 14 because an abnormal MFP is specified according to a usage environment rather than the history information such as the number of sheets printed or the power-on time.

An embodiment of the present disclosure has been described so far with reference to the drawings. However, the present disclosure is not limited to the above embodiment and may be implemented in various manners within a scope not departing from the gist thereof. Various disclosures can be formed by appropriately combining elements of configuration indicated in the above embodiment. For example, some elements of configuration may be omitted from all the elements of configuration indicated in the embodiment. The drawings schematically illustrate elements of configuration in order to facilitate understanding. Properties such as the number of each element of configuration illustrated in the drawings may differ from actual properties thereof in order to facilitate preparation of the drawings. Furthermore, each element of configuration indicated in the above embodiment is an example and not a particular limitation. Various alterations may be made so long as there is no substantial deviation from the effects of the present disclosure.

In the embodiment, the first to fourth MFPs 11 to 14 each are an electrographic MFP. However, the present disclosure is not limited to the above. The first to fourth MFPs 11 to 14 may each be an inkjet MFP, for example.

What is claimed is:

1. An image forming system comprising:

a plurality of image forming apparatuses; and a server connected to the image forming apparatuses in a communicable manner, wherein the server receives data indicating a numeric value of a common item from each of the image forming apparatuses, calculates a median of the data, and specifies an abnormal image forming apparatus from among the image forming apparatuses that has sent a numeric value of the numeric values that deviates the most from the median.

2. The image forming system according to claim 1, wherein the server issues a request for automatic solution to the abnormal image forming apparatus.

3. The image forming system according to claim 1, wherein the server issues a request for user manual solution to the abnormal image forming apparatus.

4. The image forming system according to claim 1, wherein the server receives selection as to which of a request for automatic solution or a request for user manual solution is to issue.

5. The image forming system according to claim 1, wherein the image forming apparatuses each include a fixing device that fixes a toner image to a sheet, and the data indicates a temperature of the fixing section.

* * * * *